United States Patent [19]

Nagle et al.

[11] Patent Number: 4,915,908
[45] Date of Patent: * Apr. 10, 1990

[54] METAL-SECOND PHASE COMPOSITES BY DIRECT ADDITION

[75] Inventors: Dennis C. Nagle, Ellicott City; John M. Brupbacher; Leontios Christodoulou, both of Baltimore, all of Md.

[73] Assignee: Martin Marietta Corporation, Bethesda, Md.

[*] Notice: The portion of the term of this patent subsequent to Dec. 1, 2004 has been disclaimed.

[21] Appl. No.: 927,031

[22] Filed: Nov. 5, 1986

Related U.S. Application Data

[63] Continuation-in-part of Ser. No. 662,928, Oct. 19, 1984, abandoned.

[51] Int. Cl.$^4$ ............................................. C22C 1/00
[52] U.S. Cl. ........................................ 420/590; 420/129
[58] Field of Search ................... 420/590, 129; 419/45

[56] References Cited

U.S. PATENT DOCUMENTS

| | | | |
|---|---|---|---|
| 2,852,366 | 9/1958 | Jenkins | 75/201 |
| 3,194,656 | 7/1965 | Vordahl | 420/590 |
| 3,415,697 | 12/1968 | Bredzs et al. | 149/109 |
| 3,547,673 | 12/1970 | Bredzs et al. | 117/22 |
| 3,666,436 | 5/1972 | Bredzs et al. | 75/0.5 R |
| 3,672,849 | 6/1972 | Bredzs et al. | 29/195 |
| 3,690,849 | 9/1972 | Bredzs et al. | 29/182.5 |
| 3,690,875 | 9/1972 | Bredzs et al. | 75/202 |
| 3,705,791 | 12/1972 | Bredzs et al. | 29/195 |
| 3,726,643 | 4/1973 | Merzhanov et al. | 423/409 |
| 3,785,807 | 1/1974 | Backerud | 75/138 |
| 3,801,308 | 4/1974 | Gustison | 75/129 |
| 4,161,512 | 7/1979 | Merzhanov et al. | 423/440 |
| 4,431,448 | 2/1984 | Merzhanov et al. | 75/238 |
| 4,444,603 | 4/1984 | Yamatsuta et al. | 148/127 |
| 4,514,268 | 4/1985 | DeAngelis | 204/290 |
| 4,540,546 | 9/1985 | Giessen | 420/590 |

Primary Examiner—L. Dewayne Rutledge
Assistant Examiner—David W. Schumaker
Attorney, Agent, or Firm—Herbert W. Mylius; Gay Chin

[57] ABSTRACT

A method is taught for the in-situ precipitation of second phase materials, such as ceramic or intermetallic particles, in a metallic matrix. By means of the Direct Addition Process, metal-second phase composites having highly superior properties may be obtained. Compacts of second phase-forming constituents and solvent metal are directly added to a molten metal bath to precipitate the second phase in-situ. Exemplary materials include titanium diboride or titanium carbide in an aluminum matrix.

23 Claims, No Drawings

METAL-SECOND PHASE COMPOSITES BY DIRECT ADDITION

CROSS REFERENCE TO RELATED APPLICATION

This is a continuation-in-part of application Ser. No. 662,928, filed October 19, 1984, now abandoned the disclosure of which is hereby incorporated by reference.

BACKGROUND OF THE INVENTION

The present invention comprises a process for the preparation of metal-second phase composite material and the products of that process. In the present invention, a second phase, such as a ceramic material or an intermetallic, is formed directly in a metal, metal alloy, or intermetallic matrix, in the desired volume fraction. The second phase can comprise a ceramic, such as a boride, carbide, oxide, nitride, silicide, sulfide, oxysulfide or other compound, of one or more metals the same as or different than the matrix metal. Of special interest are the intermetallics of aluminum, such as the aluminides of titanium, zirconium, iron, cobalt, and nickel. In the present invention, the second phase is dispersed in a matrix metal, metal alloy, or intermetallic, by the direct addition of second phase-forming constituents and solvent metal into a molten matrix metal. By introducing the second phase-forming constituents in this manner, reaction of the constituents with other second phase-forming constituents added to the molten matrix metal will disperse the second phase throughout the metal bath. Cooling yields a metal or intermetallic having improved properties due to the uniform dispersion of very small particulate second phase throughout the matrix, and the resultant fine grain size of the matrix. Either the introduced second phase-forming constituents or molten matrix metal, or both, may constitute an alloy of two or more metals.

For the past several years, extensive research has been devoted to the development of metal-second phase composites, such as aluminum reinforced with fibers, whiskers, or particles of carbon, boron, silicon carbide, silica, or alumina. Metal-second phase composites with good high temperature yield strengths and creep resistance have been fabricated by the dispersion of very fine (less than 0.1 micron) oxide or carbide particles throughout the metal or alloy matrix of composites formed by utilizing powder metallurgy techniques. However, such composites typically suffer from poor ductility and fracture toughness, for reasons which are explained below.

Prior art techniques for the production of metal-second phase composites may be broadly categorized as powder metallurgical approaches, molten metal techniques, and internal oxidation processes. The powder metallurgical type production of dispersion-strengthened composites would ideally be accomplished by mechanically mixing metal powders of approximately 5 micron diameter or less with an oxide or carbide powder (preferably 0.01 micron to 0.1 micron). High speed blending techniques or conventional procedures, such as ball milling, may be used to mix the powders. Standard powder metallurgy techniques are then used to form the final composite. Conventionally, however, the ceramic component is large, i.e., greater than 1 micron, due to a lack of availability, and high cost, of very small particle size materials, because their production is energy intensive, time consuming and capital intensive. Furthermore, production of very small particles inevitably leads to contamination at the particle surface, leading to contamination at the particle-to-metal interface of the composite, which in turn compromises the mechanical properties thereof. Also, in many cases where the particulate materials are available in the desired size, they are extremely hazardous due to their pyrophoric nature.

Alternatively, molten metal infiltration of a continuous skeleton of the second phase material has been used to produce composites. In some cases, elaborate particle coating techniques have been developed to protect ceramic particles from molten metal during molten metal infiltration and to improve bonding between the metal and ceramic. Techniques such as this have been developed to produce silicon carbide-aluminum composites, frequently referred to as SiC/Al or SiC aluminum. This approach is suitable for large particulate ceramics (for example, greater than 1 micron) and whiskers. The ceramic material, such as silicon carbide, is pressed to form a compact, and liquid metal is forced into the packed bed to fill the intersticies. Such a technique is illustrated in U.S. Pat. No. 4,444,603 to Yamatsuta et al., hereby incorporated by reference. Because this technique necessitates molten metal handling and the use of high pressure equipment, molten metal infiltration has not been a practical process for making metal-second phase composites, especially for making composites incorporating submicron ceramic particles where press size and pressure needs would be excessive and unrealistic.

The presence of oxygen in ball-milled powders used in prior art powder metallurgy techniques, or in molten metal infiltration, can result in a deleterious layer, coating, or contamination such as oxide at the interface of second phase and metal. The existence of such layers will inhibit interfacial bonding between the second phase and the metal matrix, adversely affecting ductility of the composite. Such weakened interfacial contact may also result in reduced strength, loss of elongation, and facilitated crack propagation.

Internal oxidation of a metal containing a more reactive component has also been used to produce dispersion strengthened metals, such as copper containing internally oxidized aluminum. For example, when a copper alloy containing about 3 percent aluminum is placed in an oxidizing atmosphere, oxygen may diffuse through the copper matrix to react with the aluminum, precipitating alumina. Although this technique is limited to relatively few systems, because the two metals must have a wide difference in chemical reactivity, it has offered a possible method for dispersion hardening. However, the highest possible concentration of dispersoids formed in the resultant dispersion strengthened metal is generally insufficient to impart significant changes in properties such as modulus, hardness and the like.

In U.S. Pat. No. 2,852,366 to Jenkins, hereby incorporated by reference, it is taught that up to 10 percent by weight of a metal complex can be incorporated into a base metal or alloy. The patent teaches blending, pressing, and sintering a mixture of a base metal, a compound of the base metal and non-metallic complexing element, and an alloy of the base metal and the complexing metal. Thus, for example, the reference teaches mixing powders of nickel, a nickel-boron alloy, and a nickel-titanium alloy, pressing, and sintering the mixed powders to form a coherent body in which a stabilizing unprecipitated "complex" of titanium and boron is dispersed in a nickel matrix. Precipitation of the complex phase is specifically avoided.

In U.S. Pat. No. 3,194,656, hereby incorporated by reference, Vordahl teaches the formation of a ceramic phase, such as $TiB_2$ crystallites, by melting a mixture of eutectic or near eutectic alloys. It is essential to the process of Vordahl that at least one starting ingredient has a melting point substantially lower than that of the matrix metal of the desired final alloy. There is no disclosure of the initiation of an exothermic second phase-forming reaction at or near the melting point of the matrix metal.

Bredzs et al, in U.S. Pat. Nos. 3,415,697; 3,547,673; 3,666,436; 3,672,849; 3,690,849; 3,690,875; and 3,705,791, hereby incorporated by reference, teach the preparation of cermet coatings, coated substrates, and alloy ingots, wherein an exothermic reaction mechanism forms an in-situ precipitate dispersed in a metal matrix. Bredzs et al rely on the use of alloys having a depressed melting temperature, preferably eutectic alloys, and thus do not initiate a second phase-forming exothermic reaction at or near the melting temperature of the matrix metal.

DeAngelis, in U.S. Pat. No. 4,514,268, hereby incorporated by reference, teaches reaction sintered cermets having very fine grain size. The method taught involves the dual effect of reaction between and sintering together of admixed particulate reactants that are shaped and heated at temperatures causing an exothermic reaction to occur and be substantially completed. The reaction products are then sintered by holding the reaction mass at the elevated temperature attained as a result of the reaction. Thus, this reference relates to a sintered product, suitable for use in contact with a molten metal.

Backerud, in U.S. Pat. No. 3,785,807, hereby incorporated be reference, teaches the concept of preparing a master alloy containing titanium diboride for grain refining aluminum. The patentee dissolves and reacts titanium and boron in molten aluminum at a high temperature, but requires that titanium aluminide be crystallized at a lower temperature around the titanium diboride formed. Thus, the patent teaches formation of a complex dispersoid.

In recent years, numerous ceramics have been formed using a process termed "self-propagating high-temperature synthesis" (SHS). It involves an exothermic, self-sustaining reaction which propagates through a mixture of compressed powders. The SHS process involves mixing and compacting powders of the constituent elements and igniting a portion of a green compact with a suitable heat source. The source can be electrical impulse, laser, thermite, spark, etc. On ignition, sufficient heat is released to suport a self-sustaining reaction, which permits the use of sudden, low power initiation of high temperatures, rather than bulk heating over long periods at lower temperatures. The SHS process occurs at higher temperatures than the present invention and is non-isothermal, yielding sintered ceramic particles having substantial variation in size. In most SHS processes, the product is a ceramic which may be relatively dense for use as a finished body, or may be crushed for use as a powder raw material. Exemplary of these techniques are the patents of Merzhanov et al, U.S. Pat. Nos. 3,726,643; 4,161,512; and 4,431,448 among others, hereby incorporated by reference.

In U.S. Pat. No. 3,726,643, there is taught a method for producing high-melting refractory inorganic compounds by mixing at least one metal selected from Groups IV, V, and VI of the Periodic System with a non-metal, such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80-88 percent titanium and 20-12 percent carbon, resulting in an exothermic reaction of the mixture under conditions of layer-by-layer combustion. These references deal with the preparation of ceramic materials, absent a binder.

U.S. Pat. No. 4,431,448 teaches preparation of a hard alloy by intermixing powders of titanium, boron, carbon, and a Group I-B binder metal or alloy, such as an alloy of copper or silver, compression of the mixture, local ignition thereof to initiate the exothermic reaction of titanium with boron and carbon, and propagation of the ignition, resulting in an alloy comprising titanium diboride, titanium carbide, and up to about 30 percent binder metal. This reference, however, is limited to the use of Group I-B metals, such as copper and silver, as binders, and requires local ignition. Products made by this method have low density, and are subjected to subsequent compression and compaction to achieve a porosity below about one percent.

U.S. Pat. No. 4,540,546 to Giessen et al, hereby incorporated by reference, teaches a method for rapid solidification processing of a multiphase alloy. In this process, two starting alloys react in a mixing nozzle in which a "Melt Mix Reaction" takes place between chemically reactable components in the starting alloys to form submicron particles of the resultant compound in the final alloy. The mixing and chemical reaction are performed at a temperature which is at or above the highest liquidus temperature of the starting alloys, but which is also substantially below the liquidus temperature of the final alloy, and as close to the solidus temperature of the final alloy as possible. While dispersion-strengthened alloys can be produced by this technique, there are a number of inherent difficulties. First, processing is technically complex, involving multiple furnaces. Second, efficient mixing is important if fine dispersions are to be consistently produced. Lastly, very high degrees of superheat will be required to completely dissolve the rapid solidification alloying elements, which necessarily accentuates particle growth, for example, in composites containing 10-20 percent dispersoid.

The present invention overcomes the disadvantages of the prior art noted above. More particularly, the present invention permits simplification of procedures and equipment compared to the prior art. For example, the present process obviates the need for multiple furnaces and mixing and control equipment because all of the constituents of the second phase are present in a single reaction vessel. The present invention also overcomes the need for forming complex or multiple melts of components at very high melting temperatures. Further, relatively high loading composites can be prepared without the necessity of achieving high levels of superheat in holding furnaces.

Applicants' invention also provides for a cleaner particle/metal interface compared with conventional metal-ceramic composites made by techniques using, for example, separate metal and ceramic powders, because the reinforcing particles are formed in-situ which leads to a superior product. With these facts in mind, a detailed description of the invention follows, which achieves advantages over known processes.

SUMMARY OF THE INVENTION

It is an object of the present invention to provide an inexpensive method for forming composite materials, in large quantities, consisting of finely dispersed second phase, such as a particulate ceramic, intermetallic material, or mixtures thereof, in metal, metallic alloy, or intermetallic matrices. For purposes of simplifying further description, the metal, metallic alloy, or intermetallic matrices of the final composite sought shall be referred to as the "composite matrix" or "final matrix".

It is a further object of this invention to provide a method for dispersion hardening of metals and alloys. It is a particular object of this invention to provide a method for preparation of a second phase material, such as ceramic particles, for example, titanium diboride particulates in an aluminum matrix, without the necessity for utilizing expensive submicron second phase starting materials. The second phase-forming constituents provide the desired volume fraction of submicron particulates when reacted in an appropriate volume of molten metal, molten alloy or molten intermetallic matrix. The terms "molten matrix metal" and "molten matrix metal, metal alloy, or intermetallic" shall hereinafter be used interchangeably when referring to the molten bath of metallic material to which the reactive second phase-forming constituents are directly added.

The present invention relates to a method for the production of metal-second phase composite materials, the method comprising precipitating at least one second phase material in a metal matrix by contacting a preformed mixture of reactive second phase-forming constituents and solvent metal in which the second phase-forming constituents are more soluble than the second phase material, with a substantially nonreactive molten matrix metal at a temperature at which sufficient diffusion of the reactive second phase-forming constituents into the substantially nonreactive solvent metal occurs to cause the second phase-forming reaction of said constituents to thereby precipitate second phase particles in the molten matrix metal so as to produce a composite comprising finely divided second phase particles in the composite matrix. The molten matrix metal itself may be of the same composition as the solvent metal, but in cases where different metals are used, the solvent metal must be compatible with, and preferably soluble in, the molten matrix metal, resulting in the formation of an alloy of the molten matrix metal as the composite matrix.

The present invention further relates to a method for the production of metal-second phase composite materials, the method comprising precipitating at least one second phase material in a metal matrix by adding at least one reactive second phase-forming constituent to a molten mass containing at least one other reactive second phase-forming constituent and a substantially nonreactive solvent metal in which the second phase-forming constituents are more soluble than the second phase material, at a temperature at which sufficient diffusion of the second phase-forming constituents into the molten mass occurs to cause a second phase-forming reaction of the constituents to thereby precipitate second phase particles so as to produce a composite comprising finely divided second phase particles in a final matrix.

The present invention also relates to composite products comprising uniformly dispersed substantially unagglomerated particles of precipitated second phase material formed in-situ by adding unreacted preformed compacts of second phase-forming constituents and solvent metal to a bath of molten metal, alloy or intermetallic.

In summary, the process of the present invention, which may be referred to as the Direct Addition Process, comprises adding reactive second phase-forming constituents and solvent metal directly to a molten matrix metal and recovering a product comprising unagglomerated particles of the second phase in a final matrix.

DESCRIPTION OF THE PREFERRED EMBODIMENTS

The present invention relates to a method for the preparation of metal-second phase composites by the direct addition of a mixture of second phase-forming constituents and a solvent metal to a molten matrix metal, resulting in the in-situ formation of finely dispersed second phase particles. The second phase-forming constituents may be added as a preform of individual powders of the reactive elements or reactive compounds and solvent metal, a compact of such reactive individual powders and solvent metal, or as alloys of such reactive elements with the solvent metal, which may be either the same as or different than the molten matrix metal. It is to be noted that a solvent metal must be present in the preform, compact or alloy to facilitate the reaction of second phase-forming constituents. The final matrix composition, or composite matrix, may thus be the same as the molten matrix metal, or an alloy of the solvent metal and the molten matrix metal. The various modes of this invention shall be discussed further hereinafter.

Thus, by the method of the present invention, it is possible, in one step, to form a second phase material, in-situ, directly in a molten metal bath, which may then be cooled to form a composite.

One embodiment of the present invention for forming the subject composite materials comprises providing a substantially molten or liquid mass of a metal alloy of the solvent metal and at least one second phase-forming constituent, and then adding another constituent of the desired second phase material to the molten mass. Thus, the molten matrix metal already contains, as an alloying element, one or more second phase forming constituents reactive with the constituent or constituents which are added. In the presence of solvent metal, an exothermic in-situ precipitation reaction of the reactive elements is initiated to form and disperse finely divided particles of second phase material in a final matrix. Thus, in one embodiment, the molten matrix metal could contain one of the constituents of the desired second phase material and the solvent metal, for example, as preformed alloy, and one or more constituents would subsequently be added.

In the embodiment wherein one second phase-forming constituent is added to a molten mass containing the solvent metal and another second phase-forming constituent, it may be necessary to agitate strongly and hold the mixture at temperature for a given time to effect the desired reaction. Examples of this embodiment include the addition of titanium powder to an aluminum-boron melt or to a copper-boron melt, and the addition of boron powder to a superheated titanium-aluminum melt. It is particularly to be noted that the second phase-forming reaction proceeds more readily at temperatures where the melt is substantially single phase.

In the preferred embodiment, the constituent or constituents are added incrementally to the molten matrix metal along with sufficient solvent metal to allow the reaction to easily proceed. With this procedure, the molten matrix metal may be different than the added solvent metal and thus need not be a solvent for the constituents.

In a particularly preferred embodiment the compact is added to the molten matrix metal under an inert atmosphere, and is quickly immersed in the melt to avoid oxidation or ejection of the reaction products. In industrial practice, the addition of the compact to the molten matrix metal may be made directly in the melting furnace or in a transfer trough of smaller dimensions just prior to casting. The latter procedure has a number of advantages including the avoidance of contamination of large furnaces by second phase materials, the ability to induce effective stirring, for example, by mechanical, inductive, or ultrasonic means, and the ability to control the atmosphere to a greater extent. Mechanical plunger or gas injection techniques may be used to introduce the compact into the molten matrix metal. Suitable gases include inert gases such as argon or helium and reactive gases such as chlorine. In the case of an aluminum molten matrix metal, chlorine, either alone or as a mixture with one of the inert gases, may be used with the added benefit of de-oxidizing the melt.

In the Direct Addition Process, it is preferable that the amount of each constituent added is such that essentially all of the constituents are consumed in the precipitation reaction, i.e., that essentially no unreacted constituent remains after the completion of the reaction. In most instances, this requirement can be met if stoichiometric quantities of the constituents are available in the compact or in the molten mass of metal. However, it may be advantageous to add one constituent above stoichiometric proportion to the compact or the molten mass of metal to essentially eliminate unwanted products which may be formed from the reaction of another constituent and the solvent metal or the matrix metal. For example, titanium aluminide which may be formed in the titanium diboride-aluminum composite can be removed by adding additional boron to the molten mass of aluminum, or to the compact prior to addition to the molten mass of aluminum. The boron can be in the form of elemental boron, boron alloy or boron halide. Such a boron addition also provides the benefit that any free titanium, which can adversely affect the viscosity of the melt for casting operations, is converted to titanium diboride.

The present invention is particularly directed to a novel process for the in-situ precipitation of fine particulate second phase materials, including ceramics, such as borides and carbides, and intermetallics, such as aluminides, within metal and alloy systems to produce a metal-second phase composite. However, the process described may also be used for producing larger particles of a second phase material in the matrix metal, up to the point at which such larger particles result in component embrittlement, or loss of ductility, etc. The improved properties of the novel composites offer weight-savings in stiffness limited uses, higher operating temperature capability and associated energy efficiency improvements, and reduced wear in parts subject to erosion. A specific use of such material is in the construction of turbine engine components, such as blades.

In this context, it should be noted that the metal-second phase products of the present invention are also suitable for use as matrix materials, for example, in long-fiber reinforced composites to enhance transverse modulus, for example, compared to conventional metal matrices. Thus, for example, a particulate reinforced aluminum composite of the present invention may be used in conjunction with long SiC or carbon fibers to enhance specific directional properties. Typical fabrication routes for such materials include diffusion bonding of thin layed-up sheets, and molten metal processing.

In the present invention, a method is taught whereby second phase forming elements are caused to react in a solvent metal to form a finely-divided dispersion of the second phase material in the solvent metal, which is evenly dispersed throughout the final matrix. In accordance with the present invention, the second phase-forming constituents most easily combine at or about the melting temperature of the solvent metal, and the exothermic nature of this reaction causes a very rapid, but localized, temperature elevation or spike, which can have the effect of melting additional solvent metal (if solid solvent metal is present), simultaneously promoting the further reaction of the second phase-forming constituents.

Moreover, the present invention incorporates the novel concept that a bath of molten metallic material may be used to advantage both as a uniform heat source and as a heat sink for in-situ precipitation reactions of second phase in a solvent metal. Thus, when reactant-plus-solvent metal compacts are added to, and submerged under the molten matrix metal, rapid and efficient liquid-solid heat transfer into the compact is effected to initiate the second phase-forming reaction. Conversely, following reaction, the same efficient liquid-solid heat transfer serves to rapidly cool the product to the temperature of the surrounding metal, thereby minimizing particle growth and sintering. It is surprising that a molten metal may be used effectively to both rapidly heat and rapidly cool the same reaction mass. The rapid heat up is important in the prevention of side reactions, such as intermetallic formation during slow heating, while the rapid cooling promotes fine particle size.

Another surprising aspect of the present process is that second phase particle formation may be combined with particle dispersion and composite formation into a single step operation. The prior art suggestion of preparing second phase particles in one operation and combining subsequently with metal, is therefore overcome by the present process. In addition, both the formation and dispersion processes are effected under substantially ideal conditions of fast heat and fast cool. The ensuing dispersion is then highly favorable because the transient exotherm and resultant expansion of absorbed gases causes vigorous agitation and mixing.

Exemplary of suitable second phase ceramic precipitates are the borides, carbides, oxides, nitrides, silicides, sulfides, and oxysulfides of the elements which are reactive to form ceramics, including, but not limited to, transition elements of the third to sixth groups of the Periodic Table. Particularly useful ceramic-forming or intermetallic compound-forming constituents include aluminum, titanium, silicon, boron, molybdenum, tungsten, niobium, vanadium, zirconium, chromium, hafnium, yttrium, cobalt, nickel, iron, magnesium, tantalum, thorium, scandium, lanthanum, and the rare earth elements. Particularly useful additional intermetallic-forming elements include copper, silver, gold, zinc, tin, platinum, manganese, lithium, and beryllium. Preferred second phase materials include titanium diboride, titanium carbide, zirconium diboride, zirconium carbide, zirconium disilicide, and titanium nitride.

As the solvent metal one may use any metal capable of dissolving or sparingly dissolving the constituents of the second phase, and having a lesser capability for dissolving the second phase precipitate. Thus, the solvent metal component must act as a solvent for the specific reactants, but not for the desired second phase precipitate. It is to be noted that the solvent metal acts primarily as a solvent for the reactive constituents in the process of the present invention, and that the constituents of the second phase precipitate have a greater affinity for each other than either has for the solvent metal, which does not react significantly with the second phase dispersoids within the time frame of the exothermic excursion. Suitable solvent metals include aluminum, nickel, titanium, copper, vanadium, chromium, manganese, cobalt, iron, silicon, molybdenum, beryllium, silver, gold, platinum, tungsten, antimony, bismuth, magnesium, lead, zinc, tin, niobium, tantalum, hafnium, zirconium, and alloys thereof. As previously indicated, the solvent metal may be the same as or different than the molten matrix metal in which the present Direct Addition Process is carried out. When the solvent metal differs from the molten matrix metal, the temperature of the molten matrix metal must be above the melting point of the solvent metal, and there must be sufficient miscibility of the two liquid metals to ensure alloying/combination. Under these circumstances, it is possible, for example, to form second phase material in a particular solvent metal (that may be particularly suitable for formation of particulates of a certain morphology, for example) and then disperse the second phase into a different matrix which may not be suited to particle formation.

In certain instances, the molten matrix metal may comprise material other than conventional metals, metal alloys or intermetallics. The molten matrix metal may, for example, be a dispersion strengthened metal such as metal containing finely dispersed erbium oxide, thoria, alumina, etc. Similarly, it is possible to use a metal-second phase composite, such as those prepared in accordance with the present invention, or in accordance with co-pending application, Ser. No. 662,928 and co-filed application, Ser. No. 927,014, as the molten matrix metal. It is important in these cases that the preexisting dispersion be stable in the molten metal for the time/temperature required for introducing the desired material. The advantage of utilizing a material containing a second phase dispersion as the molten matrix metal is that a bimodal distribution of second phase types, shapes, amounts, etc. may be obtained. An example would be the use of an aluminum matrix containing a dispersion of essentially equiaxed titanium diboride particles, to which the constituents necessary to form needle shaped TiN particles are added. A combination of dispersion strengthening and high temperature creep resistance is obtained. In accordance with the foregoing discussion, it must be understood that suitable molten matrix metals encompass the types of materials discussed above containing preexisting second phase dispersions.

Suitable molten matrix metals include the aforementioned aluminum, nickel, titanium, copper, vanadium, chromium, manganese, cobalt, iron, silicon, molybdenum, beryllium, silver, gold, tungsten, antimony, bismuth, platinum, magnesium, lead, zinc, tin, niobium, tantalum, hafnium, zirconium, and alloys of such metals. The molten matrix metal may be the same as the solvent metal, an alloy of the solvent metal, or a metal in which the solvent metal is soluble. Further, the molten matrix metal may be any metal that wets the second phase precipitate, in which the second phase precipitate is not soluble, and with which the second phase does not react during subsequent fabrication, and/or recasting. When alloys are utilized as the molten matrix metal, one may substantially retain the beneficial properties of the alloys, and increase, for example, the modulus of elasticity, high temperature stability, and wear resistance, although some loss of ductility may be encountered in certain soft alloys. For example, 7075 aluminum alloy, containing from about 5 percent to about 40 percent by weight titanium diboride, shows the same beneficial effect of age-hardening as 7075 alloy alone, but exhibits a substantial increase in modulus of elasticity, higher temperature capability, greater high temperature stability, and extremely high wear resistance. Further, the composites of the present process may be fabricated in substantially conventional fashion, by casting, forging, extruding, rolling, machining, etc. The composites of the present process may also be remelted and recast while retaining substantial uniformity in second phase particle distribution, retaining fine second phase particle size, fine grain size, etc., thereby maintaining associated improvements in physical properties. Aside from the obvious benefits in subsequent processing and fabrication, the ability to remelt and recast these materials permits recycling and reuse thereof, unlike known prior art metal-ceramic composites.

In accordance with the present invention, the Direct Addition Process enables preparation of master alloys containing a second phase concentrate, which may, in turn, be utilized to introduce the second phase into another metal in controlled fashion. It is therefore possible, by the Direct Addition Process of the present invention, to produce a composite of relatively high second phase concentration, wherein the second phase particles formed have a desired shape, size, or morphology, and to subsequently introduce such composite into another metal to produce a composite having a desired lower concentration of second phase. For example, a master alloy may be prepared having a high percentage of a second phase material, such as titanium diboride, in a matrix metal, such as aluminum. This master alloy may then be added to a molten metal, metal alloy or intermetallic bath, (which molten metal may be the same or different from the matrix metal of the master alloy) to achieve a composite having the desired concentration of second phase. It is therefore possible to form composites of relatively concentrated second phase content, wherein the second phase particles are protected from oxide or other deleterious covering layers which form on prior art ceramic powders, and to then introduce the composites into molten metal to redisperse the second phase, thus producing composites having uniform dispersions of second phase particles of desired concentrations. Additionally, with the concentrate addition procedure, it is possible to form the second phase material in a matrix metal which is conducive to the formation of particles of a desired type, size, and morphology, and thereafter incorporate the particles in a further molten metal in which such particles cannot be produced by the in-situ precipitation reaction, for example, due to relative differences in melting point.

Varying amounts of the second phase forming material may be incorporated into the composite matrix, depending upon the end use and the properties desired in the product. For instance, to produce dispersion strengthened alloys having high modulus, one may utilize a range of about 0.1 to about 30 percent by volume, and preferably from about 5 percent by volume to about 25 percent by volume, and more preferably from about 5 to about 15 percent by volume of second phase forming constituents. However, the second phase volume fraction for dispersion strengthening may be varied considerably, to produce a composite with the desired combination of properties, within the range of from about 1 percent by volume of dispersoid up to the point at which ductility is sacrificed to an unacceptable extent. The primary determining factors of the composition of the composite will be the intended use of the products. Thus, for example, for use in cutting tools the properties will be the hardness and wear resistance of the composite material produced. It is possible to effectively tailor the composition to achieve a range of desired properties by controlling the proportions of the reactant and solvent materials.

In addition to controlling the second phase amount, it is possible to effectively engineer materials by manipulating the types of matrix and second phase. Thus, for example, a reinforced matrix may be obtained by using a dispersion strengthened metal or a metal-second phase composite as the molten matrix metal. Another dispersoid type could then be added, for example as high aspect ratio needles. Depending on the final engineering requirements for the product, a wide variety of such controls may be applied to tailor the type, amount, morphology, etc. of matrix and second phase.

The Direct Addition Process of the present invention may be used to further produce high purity ceramic powders of desired particle size, morphology, and composition which are expensive and in some cases impossible to produce using prior art techniques. This may be achieved by dissolving the final matrix away from the final composite, leaving the second phase dispersoids, which, due to in-situ precipitation, inherently possess superior properties over prior art ceramic powders. For example, a final composite produced by the present Direct Addition Process, containing titanium diboride dispersoids in an aluminum final matrix, may be immersed in hydrochloric acid to dissolve the aluminum matrix, leaving titanium diboride particles having very small size, e.g. 0.1 micron.

It is believed that the prior art technique of introduction of fine second phase particles directly to a molten metal bath is technically difficult and produces metal products having less desirable properties upon solidification due to a deleterious layer, such as an oxide, which forms on the surface of each second phase particle at the time of or prior to introduction into the molten metal bath. The second phase particles of the present invention, being formed in-situ, do not possess this deleterious coating or layer. Thus, the present invention produces metal products having unexpectedly superior properties.

In the most preferred embodiment of the present invention, the reactive constituents are compacted with solvent metal powder so as to provide intimate contact of the reactive constituents with the solvent metal. It must be noted that this approach may be used even when the solvent metal and the molten matrix metal are the same. As an example of the most preferred embodiment, aluminum powder may be compacted with titanium and boron powders to form compacts, which may then be added to a molten matrix metal such as copper or aluminum.

In one mode of the invention, individual alloys may be reacted, one such alloy comprising an alloy of the solvent metal with one of the constituents of the second phase, and the other comprising an alloy of the same solvent metal, or another metal with which the solvent metal readily alloys, with the other constituent of the second phase. As an example of using two alloys of a common metal, a mixture of aluminum-titanium alloy and aluminum-boron alloy may be added to a molten aluminum bath to form a dispersion of titanium diboride in the molten aluminum. This alloy-alloy reaction route may, in some cases, be relatively slower than the elemental route, yet may offer economic advantages because the alloys utilized can be cheaper than the elemental powders. In addition, when two phase alloys are utilized, it is generally preferred that the molten matrix metal be superheated sufficiently to substantially complete the reaction. Further, it may be necessary to sustain the elevated temperature for substantial periods of time.

It is particularly to be noted that the prior art teaches that the combination of elemental metal or alloy powders, particularly of a coarse particulate size, would yield intermetallic compounds. In fact, conventional techniques for forming intermetallics involve, for example, reacting a mixture of titanium and aluminum, to form titanium aluminide, and a mixture of boron and aluminum to form aluminum diboride. Thus, one would expect that a mixture comprising powders of titanium, aluminum, and boron would yield an aggregate agglomeration of titanium aluminide, aluminum diboride, and possibly, titanium diboride. In contrast, the present invention provides for the production of essentially just one finely dispersed precipitate from the two reactive components in a final matrix of the third component or an alloy thereof. It is important that the second phase precipitate material not be soluble in the solvent metal, while the constituents of the second phase, individually, are at least sparingly soluble in the solvent metal. Thus, the exothermic dispersion reaction mechanism depends upon a certain amount of each second phase-forming constituent dissolving and diffusing in the solvent metal, and while in solution (either liquid or solid state), reacting exothermically to form the insoluble second phase, which precipitates rapidly as a fine particulate. The solvent metal provides a medium in which the reactive elements may diffuse and combine. Once the initial reaction has occurred, the heat released in the exothermic reaction and the expansion of absorbed gases, etc. enhance agitation, and hence dispersion of precipitated second phase in the molten matrix metal.

Regarding impurities, the molten matrix metal and the solvent metal may be alloyed in conventional manner, while in the reactive constituents, large amounts of alloying elements or impurities may cause problems in certain instances. For example, the presence of large amounts of magnesium in boron may inhibit the formation of titanium diboride in an aluminum matrix by forming a magnesium-boron complex on the surface of the boron particles, thus limiting diffusion of the boron in the solvent matrix. However, the presence of magnesium in the aluminum does not have this effect. That is, boride forming materials in the boron itself may inhibit the desired dissolution or diffusion of the boron and its subsequent reaction to form titanium diboride. Likewise, thick oxide films around the starting constituent powders may also act as barriers to diffusion and reaction. Extraneous contaminants, such as absorbed water vapor, may also yield undesirable phases such as oxides or hydrides, or the powders may be oxidized to such an extent that the reactions are influenced.

It is also to be noted that, in accordance with the present invention, the complex precipitation of a plurality of systems may be caused. Thus, it is possible to precipitate complex phases, such as $Ti(B_{0.5}C_{0.5})$, or alternatively, to precipitate a mixture of titanium diboride and zirconium diboride in an aluminum matrix by direct addition of the appropriate constituents, in accordance with the overall reaction:

$$Ti + Zr + 4B + Al \rightarrow TiB_2 + ZrB_2 + Al.$$

Substitution of titanium by zirconium, or vice versa, is also possible, yielding borides of the general type $(Ti,Zr)B_2$. It is also possible to achieve a low temperature solvent assisted reaction in a compact containing a metal which has a high melting temperature by alloying or admixing the high melting metal with a lower melting solvent metal. For example, titanium diboride is precipitated at very low temperatures, such as 620° C., in cobalt, chromium, and nickel by including up to 20 percent by weight aluminum. In the absence of the alloying solvent aluminum, the reaction requires temperatures of about 900° C. or greater. The low temperature reaction may be useful where it is desired to minimize the maximum temperature reached during the exothermic reaction, or to minimize the time before reaction initiation. In either case, the severity of the time/temperature treatment is reduced and there may be reduced incidence of particle growth and sintering.

As previously discussed, in the preferred embodiment of the present invention, it is desirable to form a green compact of second phase-forming constituents and solvent metal or alloy constituents in reactant concentrations outlined above for immersion in a molten matrix metal bath. The immersion in the molten bath effects formation of the second phase, which rapidly disperses in the bath.

The starting powders of the prior art, such as ceramics, typically suffer from extensive oxidation due to exposure to the atmosphere, which weakens the interfacial bonding of the ceramic into the metal matrix. The method of the present invention, however, circumvents this problem because the second phase particles are formed in-situ within the solvent metal, and thus are largely protected from the formation of a deleterious oxide layer or coating.

The particle size of the second phase reaction product is dependent upon heat-up rate, reaction temperature, cool-down rate, crystallinity and composition of the starting materials. Appropriate starting powder sizes may range from less than 5 microns to more than 200 microns. For economic reasons, one normally may utilize larger particle size powders. It has been found that the particle size of the precipitated second phase in the matrix may vary from less than about 0.01 microns to about 5 microns or larger, dependent upon such factors as discussed above.

Particle size considerations have a direct impact on the grain size of the metal-second phase composite product because the grain size is generally controlled by the interparticle spacing of the dispersoid. The interparticle spacing varies with the volume fraction and size of the dispersoid. Thus, relatively high loadings of very fine second phase particles produce the finest grained product materials. Typically the grain size of the product of the present invention is in the vicinity of one micron for second phase volume fractions between 5 percent and 15 percent. Fine grain size is extremely important, for example, in precision casting and in applications where fatigue resistance is required. By way of illustration, it is known in the manufacture of jet engine compressor disks that fine grain size and low porosity must be achieved. To initially reduce porosity of conventional materials, the cast product is subjected to hot-isostatic pressing. However, the severity of the time/temperature treatment that can be applied is limited by the grain growth that results from long times at high temperature. Accordingly, a compromise quality is obtained between sufficient densification while minimizing grain growth. The composite products of the present invention may be used to advantage in applications like this because the stable finely dispersed array of precipitates pins grain boundaries, thereby minimizing grain growth. Accordingly, in the above example, higher temperatures and longer times are possible in the hot-isostatic-press to reduce porosity without compromising grain size.

It has been found that some specific reactant properties have a greater impact than powder particle size on the particle size of the second phase produced. For example, the use of amorphous boron may result in the precipitation of a finer particle size titanium diboride than does the use of crystalline boron in an otherwise comparable mixture. The precipitation of specific particle size second phase may be selectively controlled by proper control of starting composition, temperature of reaction, and cool-down rate.

The cool-down period following initiation of the reaction and consumption of the reactive constituents is believed important to achieving very small particle size, and limiting particle growth. It is known that at high temperatures, it is possible for the second phase particles to grow, for example, by dissolution-precipitation mechanisms. This should also be avoided, in most cases, because of the negative effect of large particle sizes on ductility. Rapid temperature elevation of the molten matrix may be avoided in the Direct Addition Process by controlling the rate of addition of reactive constituents. While the temperature elevation is somewhat localized to the area in proximity to the compact added, the total molten matrix metal bath may be extensively heated when higher concentrations of second phase are produced. The cool-down or quenching of the reaction is, in a sense, automatic, because once the second phase-forming constituents are completely reacted, there is no further energy released to maintain the high temperature achieved and the large thermal mass of metal provides a quenching effect. However, one may control the rate of cool-down to a certain extent by control of the size and/or composition of the mass of material reacted, for example, by controlling the size of the constituent and solvent metal containing compact which is added to the molten matrix metal. That is, large thermal masses absorb more energy, and cool down more slowly, thus permitting growth of larger particles, such as may be desired for greater wear resistance, for example, for use in cutting tools.

An advantage of the present invention is that, if the constituents are added to a relatively large pool of molten metal in a step-wise or incremental addition, for example, the temperature of the molten matrix metal will not change significantly during the course of the addition. Thus, potential particle growth of the second phase particles will be minimized since the elevated temperatures will only occur locally, will be quenched rapidly by the large thermal mass, and will be minimized in the bulk of the melt. Such an addition procedure is also advisable from a safety standpoint to prevent the rapid evolution of significant quantities of heat which could cause metal to be splattered, sprayed or boiled from the containment vessel. Another advantage is that the exothermic reaction of the constituents, forming the second phase material, occurring in the molten mass creates a mixing effect. This, together with the concomitant expansion of adsorbed and produced gases, aids in dispersing the second phase material throughout the mass. In addition, by having the mass molten or liquid upon addition of the constituents, the constituents are rapidly heated to reaction temperature. This promotes the formation of fine second phase particles. A further important consideration of this process is that because a molten mass of matrix metal is utilized, the matrix metal need not be formed from powdered metal, but may be formed from ingot, scrap, etc., thus resulting in a significant saving in material preparation costs.

As described previously, in selecting the constituents and the matrix metal for the composite materials produced by the Direct Addition Process, it is important that the formed second phase material have a low solubility in the molten matrix metal, for example, a maximum solubility of 5 weight percent, and preferably 1 percent or less, at the temperature of the molten mass. Otherwise, significant particle growth in the second phase material may be experienced over extended periods of time. For most uses of the composite materials, the size of the second phase particles should be as small as possible, and thus particle growth is undesirable. When the solubility of the formed second phase material in the molten matrix metal is low, the molten matrix metal with dispersed second phase particles can be maintained in the molten state for a considerable period of time without growth of the second phase particles. For example, a molten mass of aluminum containing dispersed titanium diboride particles can be maintained in the molten state for three to four hours without appreciable particle growth.

With certain combinations of constituents and matrix metals, one or more of the constituents may tend to react with the molten matrix metal as the added constituent is heated up to the temperature at which the second phase-forming reaction occurs. This reaction product of the constituent and the molten matrix metal may be undesirable in the final composite and, in any event, reduces the amount of constituent available for the in-situ second phase-forming reaction. For example, when adding titanium and boron to molten aluminum, titanium aluminides (e.g. $Al_3Ti$) and aluminum diboride may be formed as the titanium and boron are heated to reaction temperature. When titanium reacts with aluminum, the formed titanium aluminide, if present as large plates, may be deleterious in the final composite and results in a lower than desired concentration of titanium diboride.

To help prevent the formation of such undesirable reaction products, the added constituent or constituents may be provided with a thin barrier layer to retard contact of the constituents with the molten matrix metal until the constituents reach the reaction initiation temperature at which the formation of the desired second phase material begins. The composition of such a barrier layer would, of course, depend upon the particular materials being utilized and should be selected so that undesirable products are not generated. Generally, the barrier layer should prevent, or at least retard, wetting of the added constituents by the molten matrix metal.

The following example teaches the preparation of a composite material by direct addition of the ceramic forming constituents to a molten mass of matrix metal.

EXAMPLE 1

An aluminum 2014 alloy is loaded in a crucible and melted to a completely molten mass. A compacted but unreacted mixture containing about 41.4 weight percent titanium, about 18.6 weight percent boron, and the remainder aluminum is prepared from powders having a particle size greater than 20 microns. The compacted mixture is then added to the molten aluminum mass. A rapid reaction occurs which results in the formation of about 23 weight percent titanium diboride dispersed in the aluminum alloy. Subsequent SEM analysis of the solidified composite material determines that the particle size of the dispersed titanium diboride is less than 1 micron, considerably smaller than the particle size of the starting titanium and boron constituents.

The following example demonstrates the use of boron nitride to coat a titanium, boron, and aluminum containing compact prior to addition to molten aluminum matrix metal.

EXAMPLE 2

Titanium, boron, and aluminum powders are mixed in a ball mill in the proper stoichiometric proportions to provide 80 weight percent titanium diboride forming constituents and 20 weight percent aluminum. 752 grams of this mixture are then placed in a tube and isostatically pressed to 40 ksi to form a compact. Pieces of the compact are coated with boron nitride from a spray can and then added to 2.3 kilograms of molten aluminum matrix metal at 920° C. The pieces of compact are observed to react more slowly and less violently than uncoated compact pieces under similar conditions. After all of the compact is reacted, the melt is mechanically stirred for several minutes and then poured at 950° C. The resultant composite is found to comprise approximately 20 weight percent titanium diboride second phase in an aluminum final matrix.

The following example illustrates the use of one second phase-forming constituent above stoichiometric proportion and the ability to remelt and recast composites made by the process of the present invention.

EXAMPLE 3

11.3 kilograms of aluminum, 3.90 kilograms of copper master alloy (20 percent Cu in Al), and 1.06 kilograms of magnesium master alloy (25 percent Mg in Al) are heated in an induction furnace to 850° C. to form a molten matrix metal. 7.39 kilograms of compact, prepared as in Example 2, except for the addition of 4 weight percent excess boron, are coated with boron nitride, slowly added to the molten matrix metal, and the melt stirred. The resultant composite is then cast in conventional manner at 935° C. to form an ingot. Analysis of the composite reveals a uniform dispersion of titanium diboride second phase particles in a 2024 aluminum alloy final matrix, with substantially no titanium aluminide present. The ingot is then remelted and recast. The resulting composite is analyzed and found to comprise a uniform dispersion of titanium diboride particles, having substantially the same average particle size as the original composite, in a 2024 aluminum alloy matrix.

The following example demonstrates the ability to disperse titanium diboride second phase particles throughout a 6061 aluminum alloy final matrix.

EXAMPLE 4

15.3 kilograms of aluminum are melted in an induction furnace. 212 grams silicon master alloy (50 percent Si in Al) and 709 grams of magnesium master alloy (25 percent Mg in Al) are added, and the temperature raised to 850° C. 7.38 kilograms of compact, prepared as in Example 2, with the addition of 4 weight percent excess boron, are coated with boron nitride and slowly added to the molten matrix metal. The melt is stirred, fluxed, skimmed, stirred again, and then cast in conventional manner. Analysis of the resultant composite reveals approximately 25 weight percent titanium diboride particles uniformly dispersed in a 6061 aluminum alloy final matrix.

The following example demonstrates the ability to disperse titanium carbide second phase particles throughout an aluminum final matrix.

EXAMPLE 5

Titanium, carbon, and aluminum powders are mixed in a ball mill in the proper stoichiometric proportions to provide 60 weight percent titanium carbide forming constituents and 40 weight percent aluminum. The mixture is placed in a tube and isostatically pressed to 40 ksi to form a compact. The compact is then added to molten aluminum matrix metal at 750° C. in the proper proportion to yield approximately 10 volume percent titanium carbide second phase in an aluminum final matrix. The resultant composite is then cast in conventional manner. Optical microscopy reveals a substantially uniform dispersion of titanium carbide particles in aluminum.

It is noted that the present invention has a number of advantages over methods taught by the prior art. For example, this invention circumvents the need for submicron, unagglomerated refractory metal boride starting materials, which materials are not commercially available, and are often pyrophoric. This invention also eliminates the technical problems of uniformly dispersing a second phase in a solvent metal, and avoids the problem of oxide or other deleterious layer formation at the second phase/metal interface during processing. Further, the present invention yields a metal matrix composite with a second phase precipitated therein, having superior hardness and modulus qualities over currently employed composites, such as SiC/aluminum. The metal matrix composite also has improved high temperature stability, in that the second phase is not reactive with the final matrix. Further, the metal matrix composite can be welded without degradation of material properties, and the weldments possess superior corrosion resistance, when compared to any metal matrix composites presently available. In addition, as opposed to composites presently available, the metal-second phase composite prepared by the method of the present invention can be remelted and recast while retaining fine grain size, fine particulate size, and the resultant superior physical properties associated therewith.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A method for the production of a composite comprising a distribution of second phase particles in a metal, metal alloy, or intermetallic final matrix, the method comprising steps of:
   (a) preparing a mixture of elemental powders of reactive second phase-forming constituents and a substantially nonreactive solvent metal;
   (b) adding the mixture to a molten matrix metal, metal alloy or intermetallic at a temperature at which sufficient diffusion of said second phase-forming constituents into the solvent metal occurs to initiate an exothermic reaction of the reactive second phase-forming constituents;
   (c) permitting the exothermic reaction to further heat the mixture, consuming the second phase-forming constituents, and to form said composite.

2. The method as set forth in claim 1, wherein the molten matrix metal is at a temperature approximating the melting point of the solvent metal.

3. The method as set forth in claim 1, wherein the second phase particles are nonreactive and insoluble in the matrix metal.

4. The method as set forth in claim 1, wherein said distribution is substantially uniform.

5. The method as set forth in claim 1, wherein the solvent metal and the molten matrix metal are of the same composition.

6. The method as set forth in claim 1, wherein at least one second phase-forming constituent is a transition metal of the third to sixth groups of the Periodic Table.

7. The method as set forth in claim 1, wherein at least one second phase-forming constituent is aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, gold, platinum or a rare earth element.

8. The method as set forth in claim 7, wherein the solvent metal and the molten matrix metal are each selected from aluminum, nickel, titanium, copper, vanadium, chromium, manganese, cobalt, iron, silicon, molybdenum, beryllium, silver, gold, platinum, niobium, tantalum, hafnium, zirconium, magnesium, lead, zinc, tin, tungsten, antimony, bismuth, or alloys of such metals.

9. The method as set forth in claim 1, wherein the mixture is compressed to form a compact prior to addition to the molten matrix metal.

10. The method as set forth in claim 9, wherein a protective coating is applied to the compact.

11. The method as set forth in claim 10, wherein said protective coating comprises boron nitride.

12. The method as set forth in claim 10, wherein said protective coating is substantially nonwettable by the molten matrix metal.

13. The method as set forth in claim 10, wherein the solvent metal is aluminum, zinc, magnesium, copper, lead, nickel, chromium, iron, titanium, cobalt, or an alloy of such metals.

14. The method as set forth in claim 10, wherein at least one second phase-forming constituent is aluminum, silicon, titanium, hafnium, tantalum, zirconium, magnesium, vanadium, nickel, or tungsten.

15. The method as set forth in claim 14, wherein at least one other second phase-forming constituent is aluminum, boron, silicon, nitrogen, or carbon.

16. The method of claim 1, wherein the particulate second phase is titanium diboride, zirconium diboride, titanium carbide, zirconium carbide, zirconium disilicide, or titanium nitride.

17. The method of claim 1, wherein the second phase particles are substantially less than 5 microns in size.

18. The method of claim 1, wherein the second phase-forming constituents are contacted in stoichiometric proportions.

19. The method of claim 1, wherein one of the second phase-forming constituents is provided in stoichiometric excess.

20. The method of claim 1, wherein the second phase is a ceramic.

21. The method of claim 1, wherein the second phase is an intermetallic.

22. A method for the production of metal-second phase composite materials, the method comprising forming at least one second phase material in a final matrix by adding a mixture comprising elemental powders of reactive second phase-forming constituents and a substantially nonreactive solvent metal in which the second phase-forming constituents are more soluble than the second phase to molten matrix metal to cause a reaction of the second phase-forming constituents to form the second phase in the final matrix.

23. A method for the production of metal-second phase composite materials, the method comprising forming at least five volume percent of second phase particles in a final matrix by adding reactive second phase-forming constituents, together with a substantially nonreactive solvent metal in which the second phase-forming constituents are more soluble than the second phase, to a molten matrix metal to cause a reaction of the second phase-forming constituents to form the second phase particles in the final matrix.

* * * * *